Figure 1:
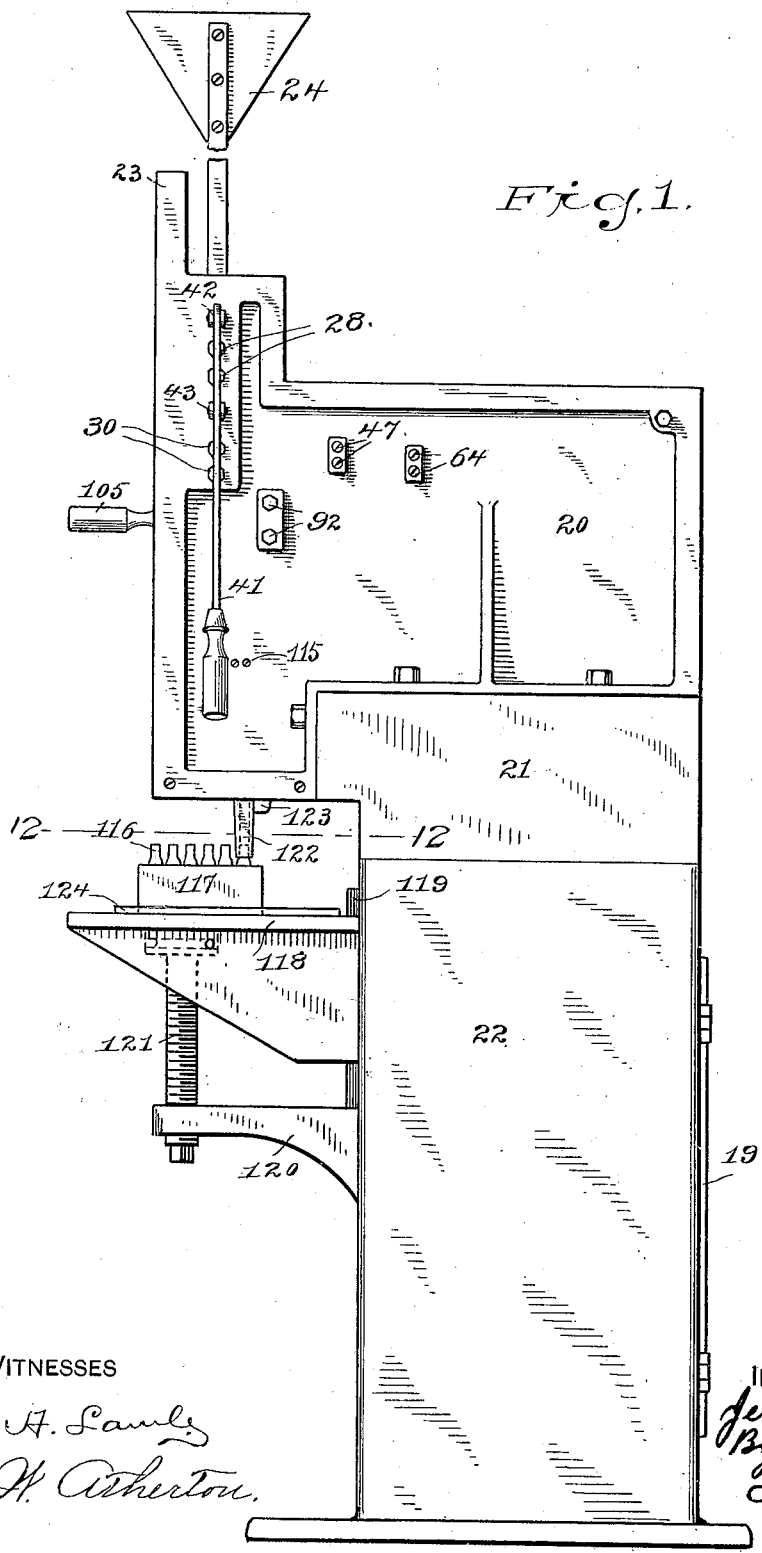

No. 655,794. Patented Aug. 14, 1900.
J. ORCUTT.
WEIGHING MACHINE.
(Application filed Apr. 11, 1900.)
(No Model.) 7 Sheets—Sheet 1.

WITNESSES
INVENTOR

No. 655,794. Patented Aug. 14, 1900.
J. ORCUTT.
WEIGHING MACHINE.
(Application filed Apr. 11, 1900.)

(No Model.) 7 Sheets—Sheet 2.

WITNESSES
H. A. Lamb
L. W. Atherton

INVENTOR
Jerome Orcutt
By A. M. Wooster
Atty.

No. 655,794. Patented Aug. 14, 1900.
J. ORCUTT.
WEIGHING MACHINE.
(Application filed Apr. 11, 1900.)
(No Model.) 7 Sheets—Sheet 3.
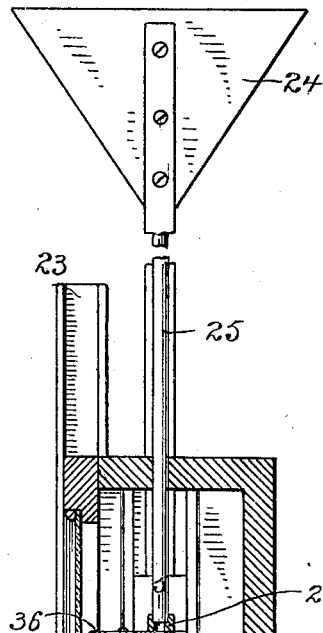
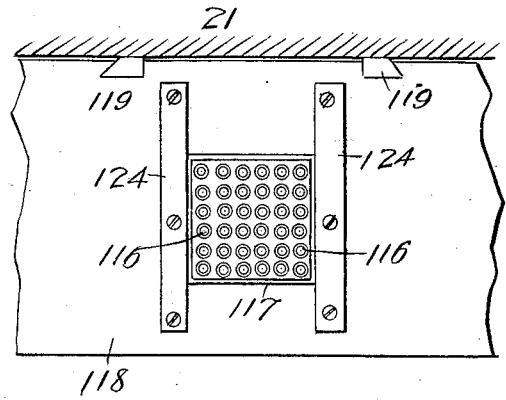
Fig. 12.
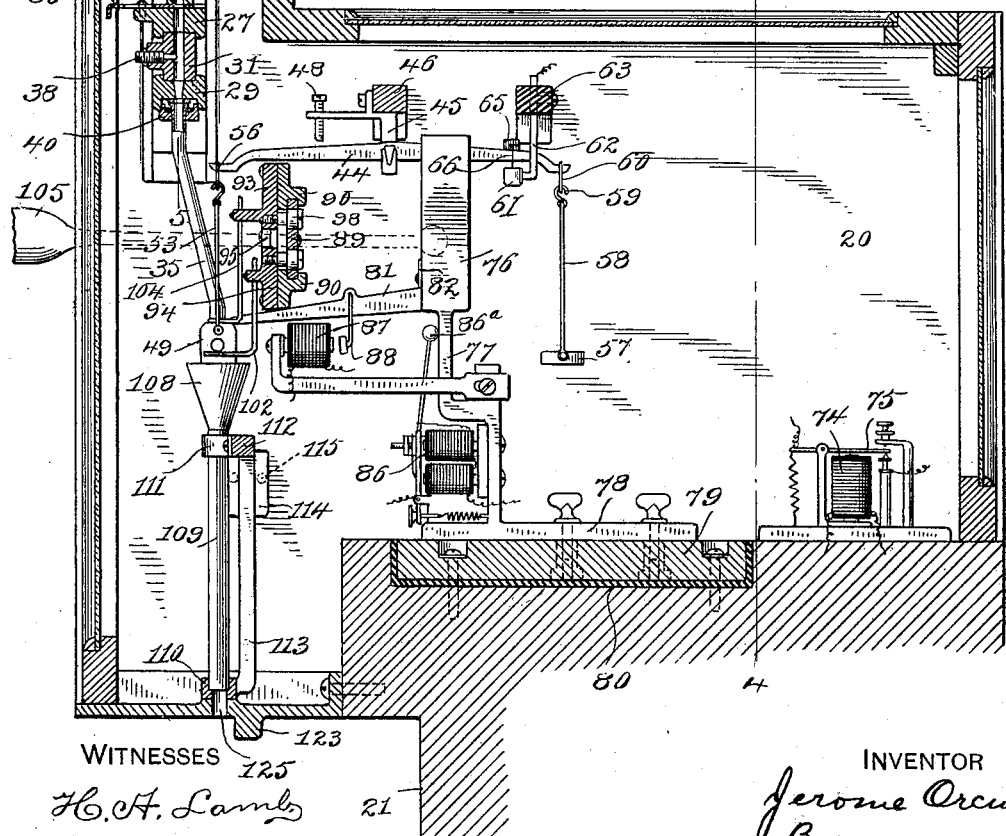
Fig. 3.
WITNESSES
H. A. Lamb
S. H. Atherton.
INVENTOR
Jerome Orcutt
By
A. M. Wooster
Atty

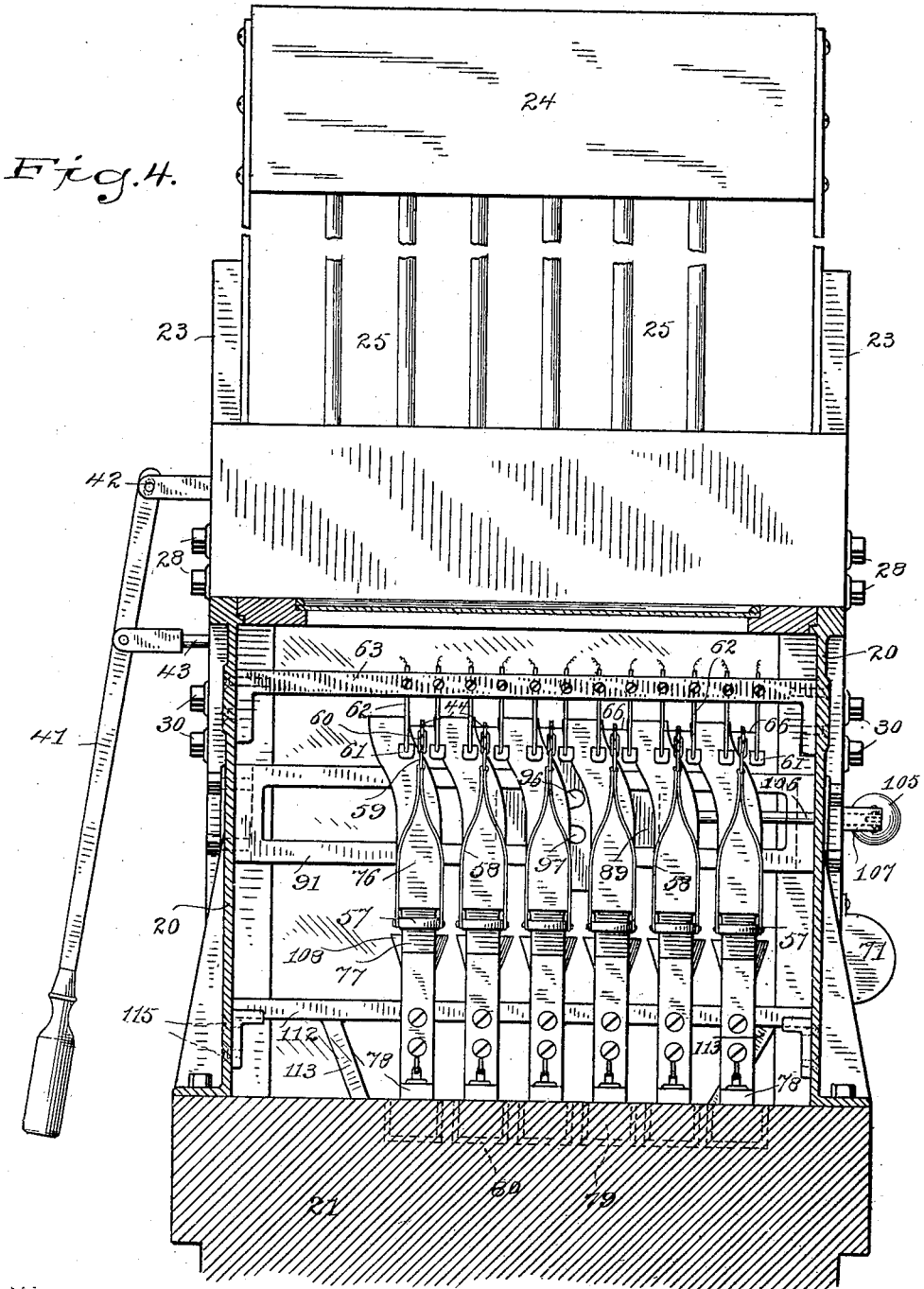

No. 655,794. Patented Aug. 14, 1900.
J. ORCUTT.
WEIGHING MACHINE.
(Application filed Apr. 11, 1900.)
(No Model.) 7 Sheets—Sheet 5.
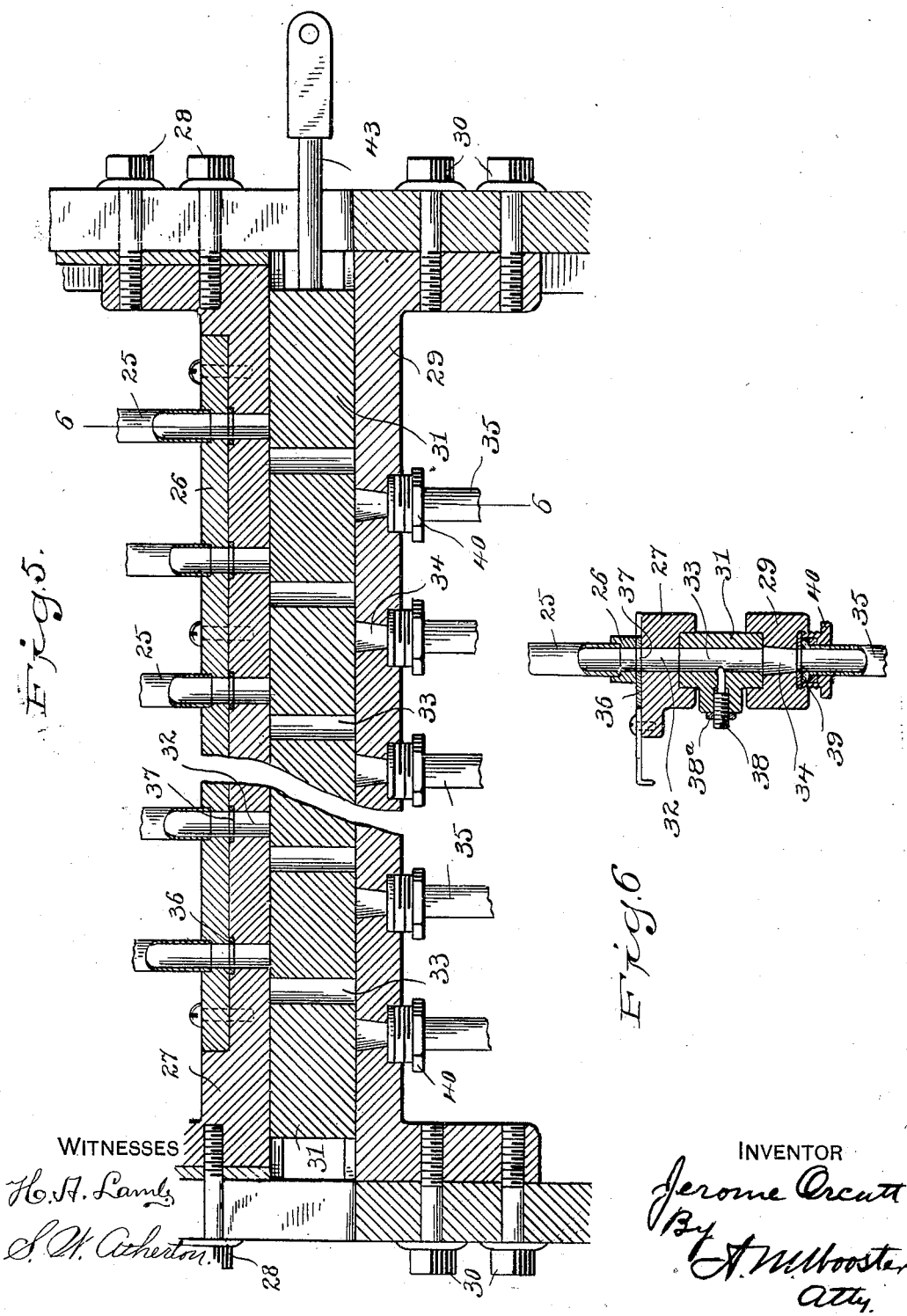

No. 655,794. Patented Aug. 14, 1900.
J. ORCUTT.
WEIGHING MACHINE.
(Application filed Apr. 11, 1900.)
(No Model.) 7 Sheets—Sheet 6.
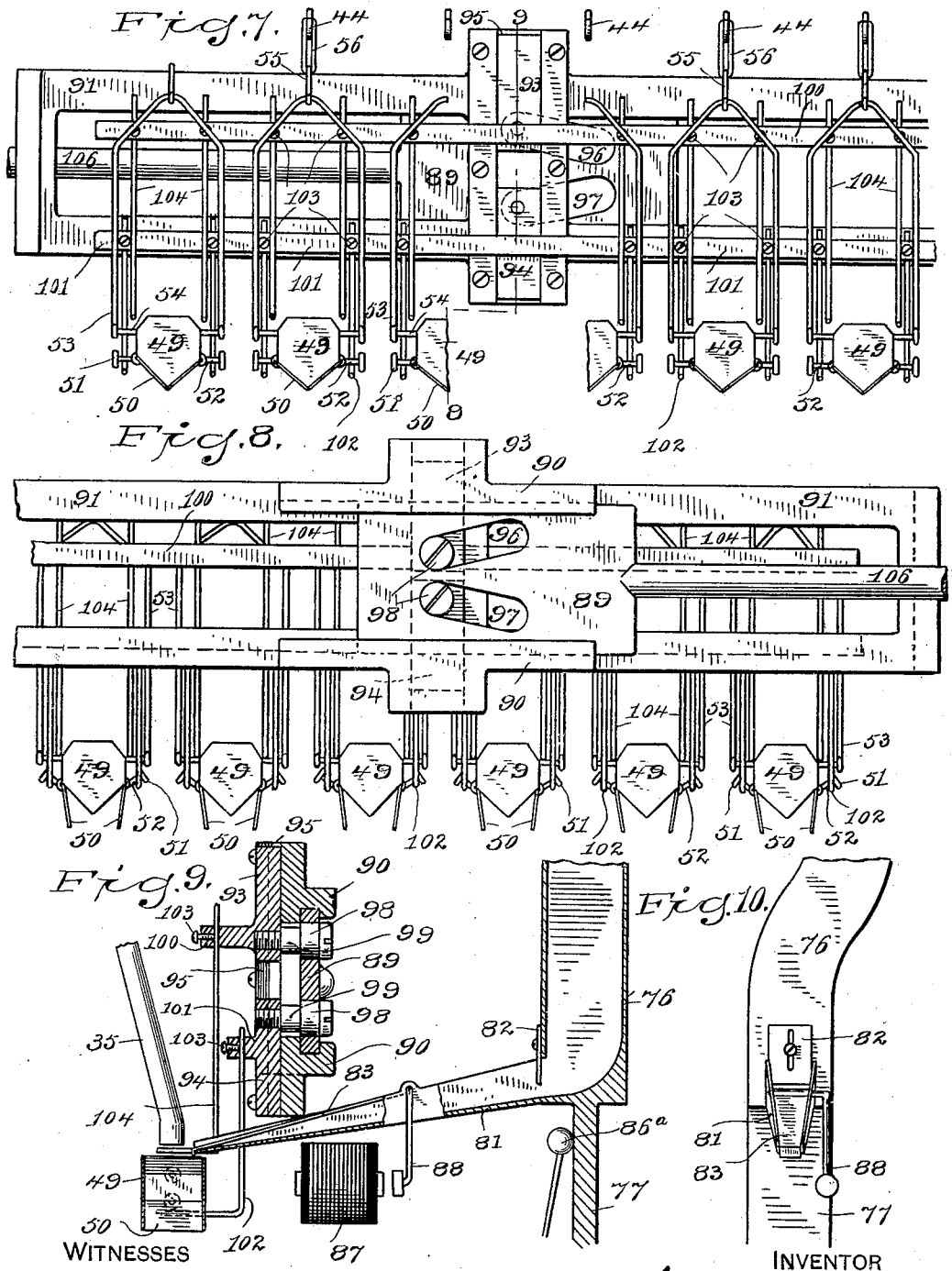

No. 655,794. Patented Aug. 14, 1900.
J. ORCUTT.
WEIGHING MACHINE.
(Application filed Apr. 11, 1900.)
(No Model.) 7 Sheets—Sheet 7.

WITNESSES
H. H. Lamb
S. W. Atherton

INVENTOR
Jerome Orcutt
By H. M. Wooster
Atty.

UNITED STATES PATENT OFFICE.

JEROME ORCUTT, OF BRIDGEPORT, CONNECTICUT, ASSIGNOR TO THE UNION METALLIC CARTRIDGE COMPANY, OF SAME PLACE.

WEIGHING-MACHINE.

SPECIFICATION forming part of Letters Patent No. 655,794, dated August 14, 1900.

Application filed April 11, 1900. Serial No. 12,458. (No model.)

*To all whom it may concern:*

Be it known that I, JEROME ORCUTT, a citizen of the United States, residing at Bridgeport, county of Fairfield, State of Connecticut, have invented a new and useful Weighing-Machine, of which the following is a specification.

My invention relates to weighing-machines adapted for general use, and especially adapted for use as cartridge-loading machines.

It is of course well understood that in order to obtain accurate results with cartridges loaded with nitrated or "smokeless" powders, so called, it is necessary, owing to the tremendous explosive force of this class of powders, to weigh with extreme accuracy the charge of powder placed in each cartridge-shell.

My invention therefore has for its object to provide a weighing-machine which will weigh a number of charges simultaneously and with extreme accuracy, which will operate quickly, but which shall be relatively simple in construction and operation and practically impossible to get out of repair.

With these ends in view I have devised the novel weighing-machine which I will now describe, referring to the accompanying drawings, forming part of this specification, and using reference characters to designate the several parts.

Figure 2:
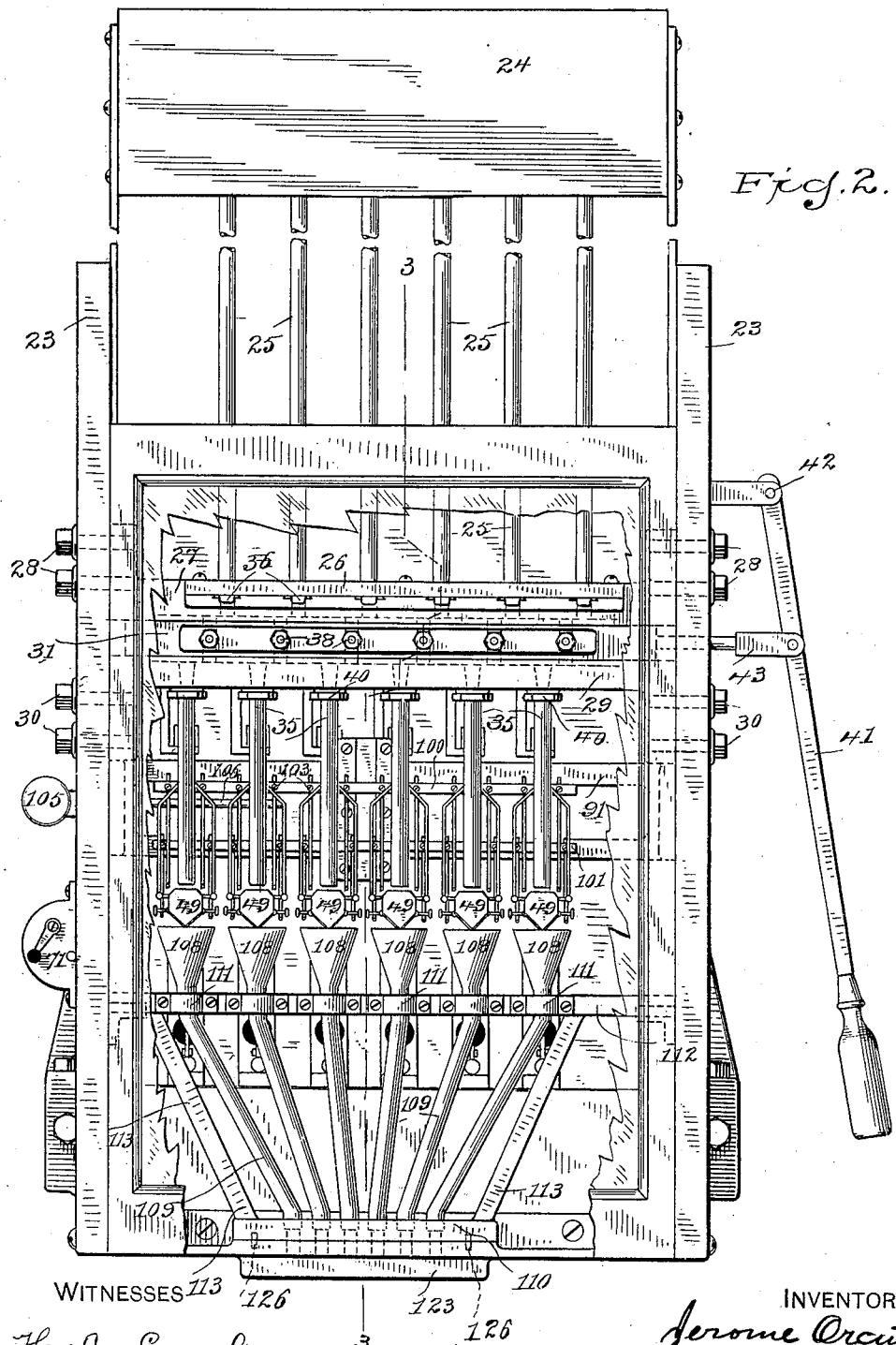
Figure 11:
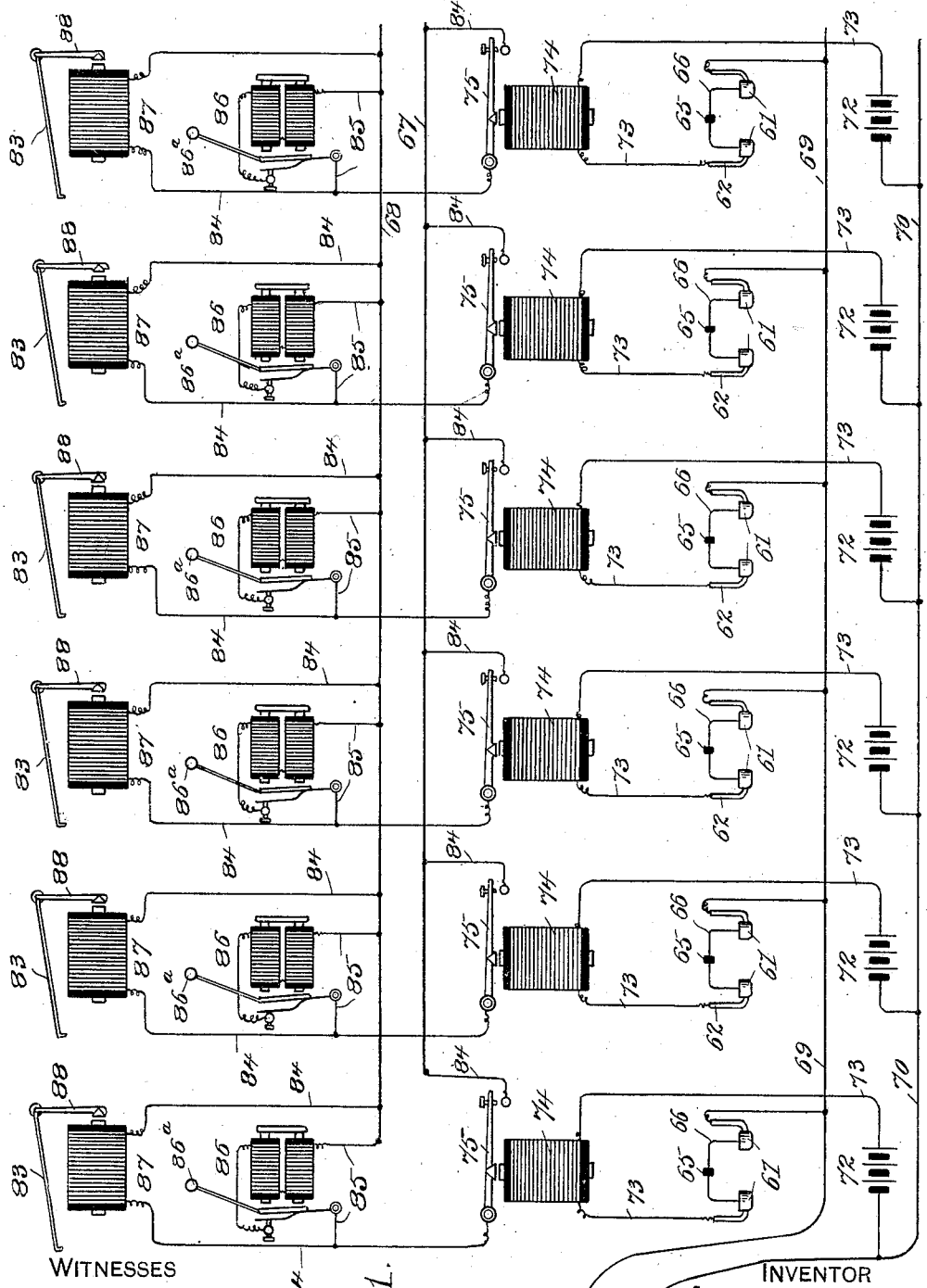

Figure 1 is a side elevation; Fig. 2, a front elevation of the operative parts of the machine on an enlarged scale; Fig. 3, a vertical section on the line 3 3 in Fig. 2; Fig. 4, a vertical section on the line 4 4 in Fig. 3, the operative parts being in rear elevation; Fig. 5, a detail sectional view, on a still larger scale, on the line 5 5 in Fig. 3, illustrating the construction and operation of the measuring-slide; Fig. 6, a detail sectional view on the line 6 6 in Fig. 5; Fig. 7, an enlarged detail front elevation of the scale-pans and gate-operating mechanism, the gates being in the closed position; Fig. 8, a corresponding rear elevation, the gates being in the open position; Fig. 9, a detail sectional view on the line 9 9 in Fig. 7; Fig. 10, an enlarged detail elevation of one of the auxiliary powder-troughs as seen from the left in Fig. 9; Fig. 11, a diagrammatic view of electrical connections for operating buzzers for rapping the auxiliary powder-reservoirs and for opening and closing gates in the auxiliary troughs, and Fig. 12 is a detail sectional view on the line 12 12 in Fig. 1.

20 denotes a case by which the operative parts of my weighing-machine are inclosed. Portions of the front, top, and back of the case are preferably of glass, and the front is shown as adapted to slide in vertical ways 23 to permit convenient access to the operative parts. This case rests on a block 21, which in turn rests upon and is rigidly secured to a cast-metal cabinet 22, adapted to contain batteries or to serve any required purpose and shown as provided with a door 19 at the back.

It is of course well understood that the nitrated or "smokeless" powders, so called, are very much safer to handle than the ordinary black powders. For convenience in description I will speak of the substance that is being weighed as "powder," although it should be understood that the machine is adapted without change to the handling of other dry substances. My novel machine is shown as adapted to weigh six charges simultaneously, although it is just as feasible to adapt the machine to weigh a smaller or a larger number of charges simultaneously. The powder is placed in a reservoir 24 above the case, from which supply-tubes 25 lead downward through the top of the case and terminate in a plate 26, which rests upon and is fixed to a cross-piece 27, adjustably secured to the sides of the case by bolts 28. Below cross-piece 27 is a cross-piece 29, which is rigidly secured to the sides of the case by bolts 30. Between cross-pieces 27 and 29 is a measuring-slide 31, which is adapted to move in ways in said cross-pieces. Plate 26 and cross-piece 27 are provided with holes 32, which register with tubes 25. The measuring-slide is provided with measuring-holes 33, and cross-piece 29 is provided with holes 34, which are preferably made slightly funnel-shaped, as shown. The holes 34 in cross-piece 29 lead into receiving-tubes 35, by which the powder is conducted to the scale-pans.

36 denotes cut-off slides lying between plate 26 and cross-piece 27 and provided with holes 37, adapted to register with the holes 32 in the plate and cross-piece, said cut-off slides being shown as recessed into the cross-piece. These cut-off slides enable the operator to regulate the amount of powder passing to each scale-pan independently or to cut off the flow of powder to each scale-pan, if required. As a means of regulating the size of the charge of powder measured in each hole in the measuring-slide I provide adjusting-screws 38, locked in position by set-nuts 38$^a$, which are adapted to extend into holes 33 and reduce the area to be filled by powder each time the holes 33 are caused to register with holes 32. The charges measured in holes 33 are in practice approximate charges only, as will be more fully explained.

The manner in which tubes 35 are connected to cross-piece 29 will be readily understood from Fig. 6. At the upper end of each tube 35 is a flange 39. 40 denotes recessed nuts having external threads which engage threaded recesses in the under side of the cross-piece, washers being placed between the ends of the nuts and the bases of the recesses in the cross-pieces and between the flanges on the tubes and the bases of the recesses in the nuts.

The measuring-slide may be operated either automatically or by hand, as preferred, the special means by which it is operated not being of the essence of my invention. In the present instance I have shown said slide as operated by means of a hand-lever 41, fulcrumed, as at 42, the inner end of said lever being connected to a rod 43, which extends through the side of the case and is rigidly secured to the slide. In use when the measuring-slide is drawn out—i. e., toward the right in Fig. 5—and holes 33 are caused to register with holes 32 said holes 33 will instantly become filled with powder, each hole measuring a charge of powder, which is, however, an approximate, not an accurate, charge, as stated above. When the measuring-slide is in an intermediate position, as in Fig. 5, the flow of powder from tubes 25 is cut off; but the charges are retained in the measuring-slide. Further movement of the slide toward the left, as seen in Fig. 5, will cause holes 33 to register with holes 34 and will permit the charges in the measuring-slide to pass down through tubes 35 to the scale-pans.

44 denotes the scale-beams, which turn on knife-edges (not shown) having their bearings in brackets 45, rigidly secured to a cross-piece 46, secured to the sides of the case by screws 47. A set-screw 48 in each bracket limits the upward movement of each scale-beam. (See Fig. 3.)

49 denotes the scale-pans, the bottom of each scale-pan consisting of two hinged gates 50, which open downward. (See Fig. 8, which compare with Fig. 7.) The gates are normally retained in the closed position, as in Fig. 7, by means of weights 51, which are shown as carried by rods 52, extending outward from the upper ends of the gates. The scale-pans are shown as carried by loops 53, which are rigidly secured to rods 54, extending outward from the sides of the scale-pans. The upper ends of the loops are loosely connected to the scale-beams, in the present instance by means of hooks 55, which engage links 56, said links engaging the forward ends of the scale-beams, as is clearly shown in Figs. 3 and 7.

57 denotes weight-pans, which are suspended from the rear ends of the scale-beams, in the present instance by means of loops 58, (see Fig. 4 in connection with Fig. 3,) at the upper ends of which are hooks 59, which engage links 60, the latter engaging the rear ends of the scale-beams.

61 denotes mercury-cups carried by rods 62, adjustably secured in a cross-piece 63, which is itself rigidly secured to the sides of the case by screws 64. In the present instance there are twelve of these mercury-cups, one each side of the rear end of each of the scale-beams, as clearly shown in Figs. 3 and 4.

65 denotes insulating-blocks on the scale-beams, and 66 U-shaped pieces of wire which pass through the insulating-blocks and the ends of which are adapted to engage the mercury in cups 61 on opposite sides of the scale-beams when the rear ends of the scale-beams are down—i. e., at their normal positions.

Turning now to Fig. 11 in connection with Fig. 3, I will explain the electrical connections. 67 and 68 denote the wires of a circuit, which for convenience I will term the "main" circuit. The current for this circuit may be supplied in any preferred manner—ordinarily by a dynamo. 69 and 70 denote wires leading to the poles of a switch 71, 72 batteries, and 73 wires, each of which leads from wire 70 through one of the batteries, through one of a series of electromagnets 74, and through a pair of mercury-cups and a wire 66 upon one of the scale-beams to wire 69. For convenience in description I shall refer to the independent circuits through wires 73 and the batteries, electromagnets 74, the mercury-cups, and wires 66 as battery-circuits. It will be understood from Fig. 11 in connection with description already given that the battery-circuits are opened and closed in series by means of the switch and that each independent battery-circuit is closed by the engagement of wires 66 with the mercury in a pair of mercury-cups and is broken whenever the forward end of the corresponding scale-beam goes down and the rear end is raised sufficiently to lift the wire 66 out of the mercury-cups, as will be more fully explained. It will be obvious that the independent battery-circuits are normally closed, but that the series is open until the switch is operated. The instant the series of independent circuits is closed the pole of each electromagnet becomes magnetized and draws its armature 75 into contact therewith. In the present instance (see Fig. 3) I have shown a spring-controlled pivoted armature—that is, an armature which is drawn by a spring away from the pole of the electromagnet the instant the current through the electromagnet ceases.

Turning now to Figs. 9 and 10, (in connection with which see Figs. 3 and 4,) 76 designates supplemental powder-reservoirs, preferably corresponding in number to the scale-pans. These reservoirs are supported by standards 77, whose bases 78 rest on blocks 79, lying in recesses in block 21, insulating packings or cushions 80 being interposed between blocks 89 and block 21, so as to insure perfect insulation and also to take up vibration and prevent any jarring of the building or of the machine itself being communicated to these supplemental reservoirs. 81 denotes troughs leading from the supplemental reservoirs to the scale-pans. Each supplemental reservoir is shown as provided with a slide 82, whereby the flow of powder therefrom is partly controlled, and each trough is provided with a pivoted gate 83, which normally cuts off the flow of powder from each trough to the corresponding scale-pan. In Figs. 9 and 10 I have shown a form of pivoted gate which closes the top of the lower end of the trough and is provided with an angle-piece which drops over the extreme end, thus instantly and effectively cutting off the flow of powder, extreme accuracy, as already stated, being an important requirement.

Turning now to Fig. 11 again, (in connection with which see Fig. 3,) 84 denotes wires, each of which leads from wire 67 through one of the armatures 75, after which the current divides, a portion passing through a wire 85 and a buzzer 86 to wire 68, the other portion of the current passing through an electromagnet 87 and to wire 68. 88 denotes the armatures of electromagnets 87, which are shown as pivoted gravity-armatures—i. e., armatures adapted to drop by gravity away from the pole of the electromagnet the instant the current through the electromagnet ceases. In the present instance gates 83 in troughs 81 are rigidly secured to armatures 88, so as to be operated thereby, as will be more fully explained. For convenience in description I shall refer to the independent circuits through wires 84 and 85, armatures 75, the buzzers, and electromagnets 87 as "local" circuits. It will be seen from Fig. 11 that each local circuit is opened and closed independently of the other local circuits by a corresponding battery-circuit.

In Figs. 3 and 11 both the battery and local circuits are shown as open. Suppose now that the battery-circuits are closed by placing the lever of switch 71 in contact with the other pole. Electromagnets 74 at once become magnetized and each armature 75 is drawn into contact with the pole of its electromagnet, thereby closing the corresponding local circuit. The instant a local circuit is closed the electromagnet 87 of said circuit becomes magnetized and draws the corresponding armature 88 into contact with its pole, thereby lifting the corresponding gate 83, the relation of the gate 83 and the armature proper being that of the arms of a bell-crank lever to each other, as will be clearly understood from Figs. 9 and 10. The instant, therefore, that an electromagnet 87 becomes magnetized a gate 83 in a trough 81 is lifted, so that powder may pass from one of the supplemental reservoirs 75 to the corresponding scale-pan. It is of course required that but a small quantity of powder pass to the scale-pan to cause the latter to descend and that the cut-off be instantaneous when the scale-beam tips. In order to accomplish the desired result, I provide, as already stated, a buzzer 86 in each local circuit. By the term "buzzer" I mean electric bell mechanism with the gong omitted, the clapper, which I have designated by 86ª, being adapted to strike the corresponding reservoir 76, or, as shown in the drawings, the standard 77, by which the reservoir is supported. In use the sound of the buzzers will be clearly audible until all of the scale-pans have gone down and all of the battery-circuits have been broken by the lifting of wires 66 out of the mercury-cups. As already stated, each local circuit and its corresponding battery-circuit are independent of the other circuits. The descent of the several scale-pans and the breaking of the several circuits is not therefore simultaneous, although in practice the scale-pans all go down very quickly, whereby the several battery and corresponding local circuits are broken, the buzzers stopped, and gates 83 dropped to shut off the flow of powder, this being the position of the parts illustrated in the drawings.

The gates 50 of the scale-pans may be opened to let the powder out either automatically or by hand, as preferred, the special operating mechanism not being of the essence of my invention. I have, however, devised a special form of hand-operated mechanism, which I will now describe, referring more especially to Figs. 7 and 8, which are, respectively, detail front and rear elevations. 89 denotes a longitudinal slide adapted to move in ways 90 in a cross-piece 91, which is rigidly secured to the sides of the case by bolts 92. 93 and 94 denote, respectively, upper and lower vertical slides, which are adapted to move in ways 95 in cross-piece 91. Slide 89 is provided with oblique slots 96 and 97. These slots are engaged by rollers 98, carried by studs 99, extending from the vertical slides, as clearly shown in Fig. 9, the parts being so constructed and arranged that when slide 89 is moved in one direction the vertical slides will be moved toward each other and when slide 89 is moved in the opposite direction the vertical slides will be moved away from each other. 100 and 101 denote bars carried by slides 93 and 94, respectively. 102 denotes hooked rods which pass through and are adjustably secured in bar 101 in any suitable manner, as by set-screws 103. These rods hook under the rods 52, carrying the weights 51, which close the hinged gates 50 of the scale-pans, so that when said bar 101 is lifted, as in Fig. 8, the gates 50 are opened—*i. e.*, swung outward—and permit the contents of the scale-pans to drop out. In order to prevent the scale-pans from being lifted and by any possibility displaced when hooked rods 102 are lifted, I provide suitably-shaped rods 104, (L-shaped, as shown in the drawings,) which are shown as passing through and adjustably secured in bar 100 by set-screws 103. These rods are adapted to engage the upper sides of the rods 54, which extend from the scale-pans and are engaged by the loops from the scale-beams. The operation of the vertical slides and of the rods 102 and 104 will be clearly understood from Figs. 7 and 8. Simultaneously with the upward movement of rods 102, by which gates 50 are opened, rods 104 will move downward and by engagement with the rods 54, extending from the scale-pans, will hold the latter in position and prevent the possibility of displacement. In the present instance I have shown slide 89 as operated by means of a hand-lever 105, pivoted to a rod 106, which extends from slide 89 and is fulcrumed, as at 107. (See Fig. 4.) When the gates 50 of the scale-pans are opened, the powder from each scale-pan drops into a funnel 108 upon a delivery-tube 109. (See Figs. 2 and 3.) These delivery-tubes are shown as supported in a carrier consisting of cross-pieces 110 and 112, connected by braces 113. The lower ends of the delivery-tubes rest in sockets in cross-piece 110, and the upper ends of said tubes are supported by straps 111, secured to cross-piece 112. Cross-piece 110 of the carrier rests upon the bottom of the case, being retained against displacement by pins 126, fixed in one of said parts and engaging holes in the other part, and cross-piece 112 rests in grooves in brackets 114, which are secured to the sides of the case by screws 115. It will be noted that in order to remove all of the delivery-tubes and funnels together it is simply necessary to lift them out with the carrier by which they are supported.

The cartridge-shells to be loaded, which I have indicated by 116, are placed in rows in a block 117. 118 denotes a table which is adapted to be moved vertically on ways 119 on the front of cabinet 22. 120 denotes a bracket rigidly secured to the front of the cabinet, and 121 an adjusting-screw which passes through the bracket and is pivotally connected to the table, so that the latter may be raised or lowered by rotation of the screw. In loading shells a funnel-block 122 is placed over the back row of shells, as in Fig. 1, and block 117 is moved backward until the funnel-block engages a stop 123 upon the under side of the case. 124 denotes guides upon the table. In use block 117 lies between two guides, one only being shown in the drawings, so that said block, while adapted to move freely, is retained accurately in position. The funnel-block is provided with a series of holes which receive the open ends of the cartridge-shells and are adapted to register with holes 125 through cross-pieces 110 and through the bottom of case 20, said holes 125 registering with tubes 109. (See Fig. 3.) The top of the funnel-block just passes under the case, the parts being made to register accurately, so that in loading cartridge-shells there is not the slightest loss of powder, but the exact amount weighed in each scale-pan is passed to a cartridge-shell. It should be noted, furthermore, that the weighing and loading are performed with an accuracy which permits only the minutest fraction of a grain in variation. The mechanism being constantly inclosed in use is protected against dust, air-currents, and sudden changes of temperature. In loading a block of shells the shells and funnel-block are placed in the position shown in Fig. 1, which leaves the back row of shells in position for loading either automatically or by successive hand operations, as I have illustrated in the present instance. The operations of loading each row of shells in a block are as follows: In the present instance the machine is adapted to load six shells simultaneously, and I have shown a block with six rows of shells. The blocks may of course be larger or smaller, if preferred, provision being made for cutting off the supply of powder to any of the measuring-holes in the measuring-slide, if desired. Having placed the shells in position, the first operation is to place the measuring-slide in the receiving position, in which position the measuring-holes will receive powder from reservoir 24. An instant later the measuring-slide may be moved to a position that will cut off the flow of powder from the reservoir and will permit the powder in the measuring-holes to pass to the scale-pans. Provision is made by means of adjusting-screws 38 for regulating the capacity of the measuring-holes. In use weights corresponding to the weight of powder required for each charge are placed in the several weight-pans, and the screws 38 are so adjusted that the amount of powder measured in each measuring-hole will just fall short of being a full charge. The instant the powder has passed the scale-pans the series of battery circuits may be closed by means of the switch, each battery-circuit instantly closing its corresponding local circuit. The effect of closing each local circuit is to open a gate in a trough leading from a supplemental powder-reservoir to a scale-pan and also to cause the clapper of a buzzer to rap the reservoir or its standard, which produces vibration or jarring enough to cause a small quantity of powder to pass from each trough to the corresponding scale-pan. The scale-beams, as already stated, turn on a minute fraction of a grain. The instant a scale-pan descends the corresponding battery-circuit is broken by the withdrawal of wires depending from the scale-beam from mercury-cups in the circuit. This demagnetizes the electromagnet in the battery-circuit and causes its armature to drop away from the core, thereby breaking the corresponding local circuit and causing the gate in the trough to drop and instantly cut off the flow of powder and also stopping the rapping of the buzzer-clapper upon the reservoir-standard. The descent of the last scale-pan will be instantly apparent by the stoppage of the rapping of the buzzer-clappers, after which the switch is opened again. Slide 89 may then be operated, which by means of the vertical slide and parts operating in connection therewith opens the gates of the scale-pans and permits the contents of the scale-pans to pass therefrom and to drop into the cartridge-shells in position to receive the charges. A return movement of slide 89 and the vertical slides releases the scale-pans and their gates and permits the scale-beams to tilt back to their normal position, the scale-pans being raised with closed gates and the rear ends of the scale-beams depressed by the weights in the weight-pans, so that the wires depending therefrom will engage the mercury-cups, and the battery-circuits may be again closed in series by the switch. The operator then moves block 117 out from under the case, places the funnel-block upon the next row of cartridge-shells from the back, and then slides the block under the case again until the funnel-block engages the stop. The measuring-slide may then be operated as before and another row of cartridge-shells in the block be filled, the several operations above described being repeated either automatically or by hand for each row of shells in the block, after which the block is removed and a new block of shells loaded in the same manner, the important result I accomplish being the quick and extremely-accurate loading of a number of shells simultaneously.

Having thus described my invention, I claim—

1. In a machine of the character described the combination with a series of scale-beams having scale-pans depending therefrom, a series of tubes leading to the respective scale-pans and means for delivering charges to the scale-pans simultaneously, of supplemental reservoirs communicating with the scale-pans, horizontally and vertically movable slides, bars carried by the vertical slides respectively and rods carried by said bars and acting to discharge the scale-pans.

2. In a machine of the character described the combination with a series of scale-beams having scale-pans depending therefrom, a series of receiving-tubes leading to the respective scale-pans and means for delivering charges to the tubes simultaneously, of supplemental reservoirs communicating with the scale-pans, a series of delivery-tubes, horizontally and vertically movable slides, bars carried by the vertical slides respectively and rods carried by said bars by which the scale-pans are caused to discharge into the delivery-tubes.

3. In a machine of the character described the combination with a series of scale-beams having scale-pans depending therefrom, a series of tubes leading to the scale-pans, means for delivering charges to said tubes simultaneously and a series of supplemental reservoirs communicating with the scale-pans, of electrical buzzers adapted to rap the reservoirs, means operated by the tilting of each scale-beam whereby the corresponding buzzer is stopped independently and mechanism whereby the scale-pans are caused to discharge simultaneously.

4. In a machine of the character described the combination with a series of scale-beams, scale-pans depending therefrom, gates 50 upon said scale-pans by which the contents are retained and means for delivering charges to said scale-pans, of a series of supplemental reservoirs, troughs leading from said reservoirs to the scale-pans, gates 83 in said troughs, electrical buzzers adapted to rap the reservoirs, means for opening the gates and starting the buzzers simultaneously and then closing each gate 83 and stopping the corresponding buzzer independently and horizontally and vertically moving slides and connections intermediate said slides and gates 50 whereby said gates are opened and closed.

5. In a machine of the character described the combination with a series of scale-beams having scale-pans, receiving-tubes leading to the respective scale-pans, cross-piece 29 which supports the receiving-tubes and is provided with holes 34, cross-piece 27 having holes 32 out of alinement with holes 34, and a slide lying between said cross-pieces and provided with measuring-holes which receive charges through holes 32, said slide when moved cutting off the supply and delivering the charges through holes 34 to the receiving-tubes, of a series of supplemental reservoirs communicating with the scale-pans, electrical buzzers corresponding with the reservoirs, means for causing said buzzers to rap the supplemental reservoirs simultaneously, means operated by the tilting of the scale-beams to stop the buzzers independently and vertically-movable slides carrying bars and rods by which the scale-pans are caused to discharge simultaneously.

6. In a machine of the character described the combination with a series of scale-beams having scale-pans, means for supplying charges to the scale-pans simultaneously, a series of supplemental reservoirs communicating with the scale-pans, gates controlling the supply from the supplemental reservoirs, electrical buzzers adapted to rap the supplemental reservoirs and means for opening said gates simultaneously with the starting of the buzzers, of means operated by the tilting of the scale-beams whereby each gate is closed and the corresponding buzzer stopped independently of the other gates and buzzers and mechanism for discharging the scale-pans simultaneously.

7. In a machine of the character described the combination with cross-pieces 27 and 29 provided with holes out of alinement, said cross-piece 29 having threaded recesses in its under side, supply-tubes registering with the holes in cross-piece 27 and receiving-tubes having at their upper ends flanges 39, of recessed nuts which receive said flanges and lock the tubes in the threaded recesses and in alinement with the holes in cross-piece 29 and a slide lying between the cross-pieces and having measuring-holes which receive charges from the supply-tubes and when moved cuts off the supply and delivers the charges to the receiving-tubes.

8. In a machine of the character described the combination with a series of scale-beams having scale-pans and weight-pans depending therefrom and means for supplying approximate charges to the scale-pans, of a corresponding series of supplemental reservoirs, troughs leading therefrom to the scale-pans, gates in said troughs, electrical buzzers having clappers adapted to rap the reservoirs and electrical connections whereby the gates are opened and the buzzers operated and each gate is closed and the buzzer stopped when the corresponding scale-pan descends.

9. In a machine of the character described the combination with a series of scale-beams each scale-beam having a scale-pan, a weight-pan and an insulating-block with a U-shaped wire depending therefrom, of reservoirs 76, troughs leading therefrom to the scale-pans, gates in said troughs, electrical buzzers having clappers adapted to rap the reservoirs, mercury-cups normally engaged by the U-shaped wires and electrical connections whereby the gates are opened and the buzzers operated, each circuit being broken independently at the mercury-cups whereby the gates are closed and the buzzers stopped when the scale-beams descend.

10. In a machine of the character described the combination with a series of scale-beams having scale-pans, weight-pans and insulating-blocks with wires 66 depending therefrom, a series of reservoirs 76 and troughs leading therefrom to the scale-pans, of gates 83 in said troughs, an electric switch, wires leading therefrom, battery-circuits leading from said wires, each circuit comprising a battery, a pair of mercury-cups and an electromagnet having a pivoted armature 75 and corresponding local circuits, each local circuit comprising an armature 75 belonging to a battery-circuit, a buzzer and an electromagnet having a pivoted armature 88 carrying a gate 83, so that when the switch is closed the electromagnets in the battery-circuits are magnetized and draw armatures 75 to their poles thereby closing the local circuits and opening the gates in the troughs and starting the buzzers, each battery-circuit being broken at the mercury-cups when the scale-beam descends thereby breaking the corresponding local circuit and closing the gate in the trough and stopping the buzzer.

11. In a machine of the character described the combination with a series of scale-beams having insulating-blocks with U-shaped wires depending therefrom, of an electric switch, wires leading therefrom, battery-circuits leading from said wires each comprising a battery, a pair of mercury-cups and an electromagnet having pivoted armatures 75 and corresponding local circuits each comprising an armature 75 of a battery-circuit, a buzzer and an electromagnet having a pivoted armature 88, whereby when the series of battery-circuits is closed by the switch the movement of each armature 75 closes the corresponding local circuit and starts the buzzer, each battery-circuit and with it the corresponding local circuit being broken at the mercury-cups by the tilting of the scale-beam.

12. In a machine of the character described the combination with a scale-beam having an insulating-block with a U-shaped wire depending therefrom, of an electric switch, a battery-circuit leading therefrom and comprising a battery, a pair of mercury-cups and an electromagnet having a pivoted armature 75, and a corresponding local circuit comprising the armature 75 of the battery-circuit, a buzzer and an electromagnet having a pivoted armature 88, whereby when the battery-circuit is closed the movement of the armature 75 closes the local circuit and starts the buzzer, the battery-circuit and with it the local circuit being broken at the mercury-cups by the tilting of the scale-beam.

13. In a machine of the character described the combination with a series of scale-pans having hinged gates 50, rods extending from said gates and weights at the outer ends of the rods by which the gates are kept closed, of vertically-movable hooked rods which are adapted to lift rods 52 and open the gates against the power of the weights.

14. In a machine of the character described the combination with a series of scale-beams, scale-pans having rods 54 extending therefrom, connections intermediate said rods and the scale-beams, and pivoted gates upon the scale-pans having rods 52 carrying weights by which the gates are kept closed, of rods 102 adapted to engage rods 52 to open the gates, rods 104 adapted to engage rods 54 to hold the scale-pans down when the gates are opened and means for operating said rods.

15. In a machine of the character described the combination with a series of scale-beams, scale-pans depending therefrom and weighted gates upon the scale-pans by which the contents are retained, of vertically-movable rods 102 by which the gates are opened against the power of the weights and vertically-movable rods 104 by which the scale-pans are held down when the gates are opened.

16. In a machine of the character described the combination with a series of scale-beams, scale-pans depending therefrom and weighted gates upon the scale-pans by which the contents are retained, of a vertically-movable slide carrying a bar 101 having adjustable rods 102 by which the gates are opened against the power of the weights and a vertically-movable slide carrying a bar 100 having adjustable rods 104 by which the scale-pans are held down when the gates are opened.

17. In a machine of the character described the combination with a series of scale-beams and scale-pans depending therefrom and carrying weighted gates by which the contents are retained, of slides 93 and 94 carrying rollers 98 and bars 100 and 101, adjustable rods in said bars by which the gates are opened and the scale-pans held down and a slide 89 having oblique slots engaged by said rollers whereby slides 93 and 94 may be moved toward or from each other.

18. In a machine of the character described the combination with a series of scale-beams, scale-pans depending therefrom and weighted gates upon the scale-pans by which the contents are retained, of slides 93 and 94 carrying rollers 98 and adjustable rods by which the gates are opened and the scale-pans held down and a slide 89 having oblique slots engaged by said rollers, movement of said slide 89 acting to move slides 93 and 94 either toward or from each other.

19. In a machine of the character described the combination with the case having holes 125 and a stop 123, of vertically-adjustable table 118 having guides 124 and delivery-tubes 109 registering with holes 125, the parts being so combined and arranged that a block of cartridge-shells with a funnel-block may be moved forward on the table between the guides and when the funnel-block engages the stop a row of cartridge-shells will be in position to receive charges from the delivery-tubes.

20. In a machine of the character described the combination with the case and the delivery-tubes, of a removable carrier for said tubes and brackets secured to the case which support the upper end of the carrier.

21. In a machine of the character described the combination with a series of scale-pans having weighted gates, mechanism for opening said gates and delivery-tubes which receive the contents of the scale-pans, of supply-tubes, a measuring-slide having holes which measure approximate charges, receiving-tubes which convey said approximate charges to the scale-pans, supplemental reservoirs having troughs leading to the scale-pans, gates in said troughs, buzzers having clappers which rap the supplemental reservoirs and electrical connections which open the gates in the troughs and operate the buzzers, the circuits being broken independently by the descent of the scale-pans.

In testimony whereof I affix my signature in presence of two witnesses.

JEROME ORCUTT.

Witnesses:
WM. H. LEACH, Jr.,
GEO. B. THORPE.